(12) United States Patent
Hamano et al.

(10) Patent No.: US 12,359,094 B2
(45) Date of Patent: Jul. 15, 2025

(54) DOUBLE-SIDED ADHESIVE FILM

(71) Applicant: KYODO GIKEN CHEMICAL CO., LTD., Saitama (JP)

(72) Inventors: Hisashi Hamano, Saitama (JP); Tatsuo Inagaki, Saitama (JP)

(73) Assignee: KYODO GIKEN CHEMICAL CO., LTD., Saitama (JP)

( * ) Notice: Subject to any disclaimer, the term of this patent is extended or adjusted under 35 U.S.C. 154(b) by 205 days.

(21) Appl. No.: 17/998,400

(22) PCT Filed: May 13, 2021

(86) PCT No.: PCT/JP2021/018176
§ 371 (c)(1),
(2) Date: Nov. 10, 2022

(87) PCT Pub. No.: WO2021/230313
PCT Pub. Date: Nov. 18, 2021

(65) Prior Publication Data
US 2023/0220243 A1 Jul. 13, 2023

(30) Foreign Application Priority Data

May 14, 2020 (JP) ................. 2020-085422

(51) Int. Cl.
*C09J 7/24* (2018.01)
*C09J 7/38* (2018.01)
*C09J 9/02* (2006.01)

(52) U.S. Cl.
CPC ............. *C09J 7/24* (2018.01); *C09J 7/385* (2018.01); *C09J 9/02* (2013.01);
(Continued)

(58) Field of Classification Search
CPC ....... C09J 7/24; C09J 7/385; C09J 9/02; C09J 2301/41; C09J 2301/408; C09J 2301/414;
(Continued)

(56) References Cited

U.S. PATENT DOCUMENTS 3,062,683 A * 11/1962 Kalleberg ................. C09J 7/38
442/151
4,818,610 A 4/1989 Zimerman et al.
2005/0045855 A1* 3/2005 Tonapi ................. H01L 24/29
252/500

FOREIGN PATENT DOCUMENTS

JP S63-268784 A 11/1988
JP H02-6790 B2 2/1990
(Continued)

OTHER PUBLICATIONS

JPlatPat machine translation of JP 2017-075281 (Year: 2017).*
International Search Report dated Aug. 10, 2021 issued in PCT/JP2021/018176.

*Primary Examiner* — Alicia J Weydemeyer
*Assistant Examiner* — Laura B Figg
(74) *Attorney, Agent, or Firm* — Rankin, Hill & Clark LLP (57) ABSTRACT

The purpose of the present invention is to provide a double-sided adhesive film which has a generally equal elongation in the XY (longitudinal and transverse) directions, more preferably in the thickness direction, while being prevented from the occurrence of adhesive protrusion or glue burr, and which has higher adhesive force and higher holding power in comparison to similar single-layer adhesive articles, while being applicable to a stretchable or flexible adherend. A double-sided adhesive film according to the present invention is a substrate-less double-sided adhesive film which is composed of a center layer that is formed of a resin adhesive, and adhesive layers that are superposed on the front surface and the back surface of the center layer, said adhesive layers being formed of a resin that is the same as or similar to the resin that constitutes the center layer, wherein the weight average molecular weight or the crosslinking degree of the resin that constitutes the center layer is higher than the
(Continued)

weight average molecular weight or the crosslinking degree of the resin that constitutes the adhesive layers. This double-sided adhesive film is characterized in that the tolerance between the elongation in the longitudinal direction and the elongation in the transverse direction is ±20% or less relative to one of the elongations, more preferably, the elongation in the longitudinal direction and the elongation in the transverse direction are equal to each other.

20 Claims, 2 Drawing Sheets (52) U.S. Cl.
CPC .. *C09J 2301/1242* (2020.08); *C09J 2301/408* (2020.08); *C09J 2301/41* (2020.08); *C09J 2301/414* (2020.08); *C09J 2433/00* (2013.01); *C09J 2433/006* (2013.01); *C09J 2475/00* (2013.01)

(58) Field of Classification Search
CPC ............ C09J 2301/1242; C09J 2433/00; C09J 2433/006; C09J 2475/00
See application file for complete search history.

(56) References Cited

FOREIGN PATENT DOCUMENTS

| | | | | | |
|---|---|---|---|---|---|
| JP | H09-208907 | A | | 8/1997 | |
| JP | 2007-105983 | A | | 4/2007 | |
| JP | 2011-219665 | A | | 11/2011 | |
| JP | 2013-146945 | A | | 8/2013 | |
| JP | 2017075281 | A | * | 4/2017 | ............ C08F 220/14 |

* cited by examiner

The lowest and highest values of peel being used for the method of evaluating stress absorption (stretching) characteristics.

FIG. 3

RELATED ART

The lowest and highest values of peel being used for the method of evaluating stress absorption (stretching) characteristics.

DOUBLE-SIDED ADHESIVE FILM

FIELD OF THE INVENTION

The present invention relates to a baseless double-sided adhesive film.

Note that the term "film" as used in the present invention includes tapes, sheets, and films in form.

BACKGROUND OF THE INVENTION

Hitherto, as adhesive films having been used, there are known adhesive films having an adhesive layer formed on one of or adhesive layers formed both sides of a base (base layer) made of polyethylene terephthalate (PET) or non-woven fabric (see Patent Literature 1, [0002] and [0003]). (The term "adhesive" as used herein refers to, among adhesives, an adhesive that has viscoelasticity at room temperature and in the absence of a solvent, and that is fluidized under pressure to have a required bond strength. The same applies to the following.) Note that such an adhesive film is subjected to various types of processing such as cutting into a predetermined size and shape by punching, slitting, and the like, according to various purposes.

However, the above-described conventional double-sided adhesive films using the base have problems such as inability to reduce the thickness of the film and poor punching property.

In particular, since the mechanical properties (physical properties) differ greatly between the base layer and the adhesive layer, there are problems such as difficulty in stretching and sticking evenly according to the shape of the adherend. In addition, there is also a problem of poor workability, for example, that when the film is cut, only the adhesive layer is stressed, causing twists and glue burrs.

For example, there is a double-sided adhesive tape in which a biaxially stretched PET film with excellent dimensional stability is used as a base layer, and the adhesive layer is formed on both sides of the base layer. As can be seen in Table 1 described later, the difference in shear strength between the base layer and the adhesive layer with such a structure is 180:1 in comparison between the base layer with a thickness of 5 μm and the adhesive layer with a thickness of 25 μm (base layer:adhesive layer). For the base layer with a thickness of 25 μm (see Table 2), the difference is 400:1 (base layer:adhesive layer).

As can be seen in Table 1, while a longitudinal elongation ratio of the biaxially stretched PET film (with a thickness of 5 μm) of the base layer is 142%, a longitudinal elongation ratio of the adhesive layer is 400% or more, which is about 2.8 times or more that of the base layer (base layer:adhesive layer=1:2.81).

Similarly, while a transverse elongation ratio of the biaxially stretched PET film (with a thickness of 5 μm) of the base layer is 118%, a transverse elongation ratio of the adhesive layer is 400% or more, which is about 3.3 times or more that of the base layer (base layer:adhesive layer=1:3.38).

A heat shrinkage in longitudinal and transverse directions of the biaxially stretched PET film in an atmosphere of 150° C./3 min is 0.2% in the transverse direction, and is 1.4% in the longitudinal direction, which is seven times of the shrinkage in the transverse direction (anisotropic).

On the other hand, for the base layer using a wet-laid rayon non-woven fabric, according to Table 1, a heat shrinkage of the wet-laid rayon non-woven fabric is 0.15% in the longitudinal direction, and is 0.5% in the transverse direction. This is advantageous in dimensional stability property as compared to the biaxially stretched PET film. However, since it is impossible to avoid the directionality of water flow in the manufacturing method, a shear strength of the wet-laid rayon non-woven fabric is 9.7 N in the longitudinal direction, and is 1.3 N in the transverse direction, which is about 1/7 of the shear strength in the longitudinal direction (anisotropic).

As described above, referring to Table 1, the shear strength of the biaxially stretched PET film in the longitudinal direction is 180 to 400 times of that of the adhesive, and the shear strength of the wet-laid rayon non-woven fabric in the longitudinal direction is about 90 times of that of the adhesive. On the other hand, they have the opposite relation with elongation ratio. Specifically, the elongation ratio of the adhesive is 400% or more, and the elongation ratios of the wet-laid rayon non-woven fabric and the biaxially stretched PET film in the longitudinal direction are about 1/133 and about 1/3, respectively, of that of the adhesive. In any case, there is a large difference in mechanical strength (physical property) between the base layer and the adhesive layer.

The biaxially stretched PET film and the wet-laid rayon non-woven fabric have different mechanical strengths (physical properties) in the longitudinal and transverse directions (anisotropic).

TABLE 1

| | | | Physical properties | | | |
|---|---|---|---|---|---|---|
| | | Unit | Biaxially stretched PET film Stretched 5 times Thickness 5 μm | Wet-laid rayon non-woven fabric Basis weight 14 g/m² | Acrylic adhesive only Thickness 25 μm | Measurement method |
| Shear strength | Longitudinal direction | N | 18 | 9.7 | 0.1 or less Unmeasurable | In accordance with JIS K 7127 |
| | Transverse direction | | 14 | 1.3 | 0.1 or less Unmeasurable | Same as above |

TABLE 1-continued

| | | Unit | Biaxially stretched PET film Stretched 5 times Thickness 5 μm | Wet-laid rayon non-woven fabric Basis weight 14 g/m² | Acrylic adhesive only Thickness 25 μm | Measurement method |
|---|---|---|---|---|---|---|
| Elongation ratio | Longitudinal direction | % | 142% | 2.8 | 400 or more Unmeasurable | Same as above |
| | Transverse direction | | 118 | 3.2 | 400 or more Unmeasurable | Same as above |
| Heat shrinkage rate 150° C./3 min | Longitudinal direction | % | 1.4 | 0.15 | 0.05 | In accordance with JIS C 2318 |
| | Transverse direction | | | 0.2 | 0.5 | 0.05 | |

TABLE 2

Relation between thickness and physical properties

| Biaxially stretched PET film | | Acrylic adhesive only | |
|---|---|---|---|
| Shear strength g/25mm | Elongation ratio % | Shear strength g/25 mm | Elongation ratio % |
| 1800 (4.5 pm) | 140 | 10 or less | 400 or more |
| 2300 (12 pm) | 141 | 10 or less | 350 or more |
| 4000 (25 pm) | 142 | 10 or less | 350 or more |

The above-described large difference in physical property between the base layer and the adhesive layer and the different orientation (anisotropy) in which the base layer has different physical properties in the longitudinal and transverse directions result in lack of uniformity in plastic deformation in the entire finished double-sided adhesive film. This makes it likely to cause wrinkles and the like when the adherends are bonded together and to cause an unexpected error signal in such films as used for steering wheel sensors, pressure sensors, and the like.

In cases where double-sided adhesive films are used in products that require high precision in, for example, electronic parts being bonded in communication devices such as sensors, the double-sided adhesive films are finely cut. As a result, there is a possibility that the desired functions will not be achieved, resulting in product defects or the like, due to a bent parting part in shape after cutting out, a transfer of glue burrs to mounting parts, or a lifted electronic part caused by the glue burrs.

For conventional adhesive films using a base, glue burrs generated by shearing the adhesive layer during punching may adhere to a machining tool such as a cutting blade of the shearing machine, a drill, or a slitter. Such glue burrs may interfere with a process after the shearing in continuous processes, which may cause the production line to be interrupted. Accordingly, after punching, pressing, or the like, for example, high-density inspection is required to check whether adhesive burrs have transferred to the finished products, whether the adhesive films have successfully been punched, and the like. In addition, work is required to remove the glue burrs adhering to the blade every 40,000 shots. As a result, these cause the problem that the manufacturing process is complicated.

Note that, in conventional adhesive films in which an adhesive layer is laminated on a base layer, it is speculated that one of the factors that cause glue burrs to occur due to shearing such as punching and drilling is that an interface with a different elongation ratio from the base layer and the adhesive layer is present between the two layers. This may be because most of the glue burrs are caused by the breakage of this interface, which causes the adhesive that forms the adhesive layer to peel off from the base.

RELATED ART LITERATURES

Patent Literature

[Patent Literature 1] Japanese Patent KOKAI No. H9-208907 (LOPI; automatically published after around 18 months from filing date regardless prosecution)
[Patent Literature 2] Japanese Patent KOKAI No. S63-268784

SUMMARY OF THE INVENTION

Problems to be Solved by the Invention

In order to solve the problems associated with the above-described conventional adhesive films using a base, baseless double-sided adhesive films (without base) made from only an adhesive layer have been proposed.

However, the conventional baseless double-sided adhesive films have the following problems.

(1) Such a baseless double-sided adhesive film is prone to blocking, so that it is not possible to increase tackiness. For example, in a conventional baseless double-sided adhesive film, the adhesive layer exudes during storage, and that the adhesive exuding blocks the unrolling of the adhesive tape, making it unusable.

(2) If there is no base, the adhesive may be insufficiently held, which causes a problem that the adhesive layer is dragged out by the slitter during slitting (resulting in the occurrence of glue burrs).

The occurrence of glue burrs is a particular problem when a precision is required, such as when electronic parts are bonded. In other words, there is a problem that the glue burrs cause the bonded electronic parts to lift, resulting in defective products.

For the conventional baseless adhesive films, the occurrence of any glue burrs cannot be avoided due to the nature of the adhesive adhering to anywhere and easily stretched. In addition, since the glue burrs have an adhesive function, they are likely to grow and cause even more obstacles.

Note that approaches to solve such problems are known such as a method of adopting an adhesive with an increased molecular weight of 800,000 to 1,000,000 or more, or a method of preparing a highly crosslinked adhesive. However, in such methods, the tackiness is likely to be reduced, so that bonding at room temperature may be sacrificed, and Tg is also increased, so that bonding at low temperatures is likely to be sacrificed.

(3) It is difficult for an adhesive film made from only the adhesive layer to have different adhesiveness between the front face and the rear face of the film. For example, Japanese Patent KOKAI No. S63-268784 discloses a baseless adhesive film that is made from a photocrosslinkable adhesive layer (single layer) containing an acrylic copolymer as a component and having front and rear faces having a difference in bond strength based on the difference in extent of crosslinking.

Japanese Patent KOKAI No. S63-268784 discloses that it is attempted to make the double-sided adhesive film have different adhesiveness between the front face and the rear face. However, since the adhesiveness of the double-sided adhesive film varies only depending on the presence or absence of crosslinking in the single adhesive layer, it is not always possible to obtain a sufficient difference in adhesiveness. In addition, that double-sided adhesive film still has problems such as the blocking and the adhesive exuding, as described above.

(4) The inventor(s) have found through extensive research that, when such a film is affixed to a soft material such as a planar heat-generating sheet for a steering wheel sensor of a car or for a car seat, the film fails to follow the plastic deformation of the adherend and causes strain such as lifting unless it has a predetermined adhesive strength and thickness, substantially uniform non-orientation in the longitudinal and transverse directions, and stress relaxation (stretchability).

Similarly, for applications to connected cars, sensors, soft actuators, and the like, where stress relaxation (stretchability), flexibility, and the like are required, since the conventional baseless double-sided adhesive films have problems such as insufficient adhesive strength as well as strain and breakage due to differences in an elongation ratio, a heat shrinkage rate, and the like between the longitudinal and transverse directions (anisotropy), they are not suitable. Note that, if the double-sided adhesive film has residual strain, it could be a factor that causes a pressure sensor to malfunction, namely, a factor that interferes with the sensing function of the sensor.

In addition to the above-described problems, the conventional double-sided adhesive films have disadvantages such as that the adhesive layer may exude and peel off, and as a result, the conventional double-sided adhesive films or the single adhesive layer have a problem in that it is difficult to satisfy the above-mentioned multiple requirements at once because the performance of the entire film is governed by the properties of the adhesive to be employed.

In view of the above-mentioned problems, an object of the present invention is to provide a double-sided adhesive film: preventing an adhesive from exuding and glue burrs from occurring; having a substantially equal elongation ratio in XY (longitudinal and transverse) directions, more preferably in a Z (thickness) direction; having an adhesive strength and a holding power that are allowed to be equally increased by a factor of 1.5 to 3 in the longitudinal and transverse directions as compared to the same single adhesive layer product (comparable to viscoelastic bonding); and being applicable to stretching and flexible adherends.

Means for Solving the Problem

In order to achieve the above object, a double-sided adhesive film of the present invention is the double-sided adhesive film without base, comprising:
  a center layer formed of an adhesive made from a resin; and
  adhesive layers laminated on a front face and a rear face of the center layer and formed of a resin that is same as or belongs to a same family as the resin that forms the center layer:
  a weight average molecular weight or an extent of crosslinking of the resin that forms the center layer being higher than a weight average molecular weight or an extent of crosslinking of the resins that form the adhesive layers, and
  a tolerance between an elongation ratio in a longitudinal direction and an elongation ratio in a transverse direction being ±20% or less with respect to one elongation ratio, more preferably, the elongation ratio in the longitudinal direction and the elongation ratio in the transverse direction being equal.

Preferably, the elongation ratios in both the longitudinal and transverse directions are in a range of 20% to 300%.

Preferably, a total thickness of the double-sided adhesive film is 5 μm to 300 μm.

Preferably, a ratio between the elongation ratio of the resin that forms the center layer and the elongation ratio of the resin that forms the adhesive layers is from 1:1 to 1:20.

Preferably, the center layer and the adhesive layers are not oriented.

Preferably, molecules in the resin that forms the center layer and molecules in the resin that forms the adhesive layers are crosslinked in an interface region between the center layer and the adhesive layer.

Preferably, each of the elongation ratios in the longitudinal direction, the transverse direction, and a thickness direction has a tolerance of ±20% or less with respect to the elongation ratios in the other two directions.

Preferably, the center layer is formed of a resin selected from natural or synthetic rubber, acrylic resin, olefin resin, silicone resin, urethane resin, and polyester resin.

The adhesive layer (the first adhesive layer) laminated on the front face of the center layer and the adhesive layer (the second adhesive layer) laminated on the rear face of the center layer may be formed of resins having different adhesive strengths.

An electrically conductive material may be added to the double-sided adhesive film of the present invention. Especially, it is preferable that the electrically conductive material is added to the center layer and the adhesive layers, and a weight percentage of the electrically conductive material added to the center layer with respect to the resin that forms the center layer is higher than a weight percentage of the electrically conductive material added to the adhesive layers with respect to the resin that forms the adhesive layers.

A thermally conductive material may be added to the double-sided adhesive film of the present invention. Especially, it is preferable that the thermally conductive material is added to the center layer and the adhesive layers, and a weight percentage of the thermally conductive material added to the center layer with respect to the resin that forms the center layer is higher than a weight percentage of the thermally conductive material added to the adhesive layers with respect to the resin that forms the adhesive layers.

Fiber fragments may be dispersed in the center layer.

Effect of the Invention

According to the double-sided adhesive film of the present invention having the above-described configuration, the center layer and the adhesive layer are each made from an adhesive resin, and the resins are similar to each other in terms of composition, so that the center layer and the adhesive layer are easily matched with each other at an interface between the layers. The resin of the adhesive layer can almost completely penetrate deep into recesses of a fine uneven outer face of the center layer (there is no gap between the adhesive layer and the center layer). Accordingly, in addition to a high intermolecular force being obtained, a gradient of distribution of molecular weight or extent of crosslinking is produced from the center of the film in the thickness direction toward the outside (front and rear face sides), and the interface between the center layer and the adhesive layer is disappeared or alleviated. This results in a gradient of the elongation rate in the thickness direction and a high bonding force between the layers, making it difficult for delamination to occur, making the entire film excellent in stress relaxation, making the film free from twisting or exuding when cut, and the like, which exhibit excellent workability. Moreover, problems do not occur such as blocking and adhesive exuding, which are seen in baseless double-sided adhesive films.

The double-sided adhesive film of the present invention can be uniformly stretched and affixed according to the shape of the adherend, associated with the above-described advantageous effects by making the elongation ratio in the longitudinal and transverse directions substantially equal. It is also easy for the double-sided adhesive film to plastically deform (follow) regardless of the shape, movement, and deformation of the adherend. Moreover, no lack of uniformity in the plastic deformation and the gradient of the distribution of molecular weight and the entanglement of molecules in a region between the center layer and the adhesive layer produce an excellent stress relaxation effect, so that it is possible to prevent strain, breakage, and the like of the film after affixation.

As described above, the double-sided adhesive film of the present invention can be freely designed in various functionalities, thickness, and material properties according to the application such as industrial use, medical use, and the like, and its finished product has equal expansion and contraction in the longitudinal and transverse directions. Therefore, the range of application for the double-sided adhesive film can be expanded for lamination in, for example, temperature sensors, pressure sensors, connected cars, and soft actuators.

Note that it is more preferable that both the center layer and the adhesive layer are not oriented.

Further, according to the double-sided adhesive film of the present invention, adhesive layers can be formed with different adhesive strengths on the front face and the rear face of the film, allowing easy placement to affix the film by affixing and peeling a film face with the weaker adhesive strength to and from the adherend.

In addition, the double-sided adhesive film has a three or more layer structure including functional materials having electrical conductivity, heat dissipation, and the like in order to obtain the compounding gradient of the functional materials, and as a result, it is possible to control both exhibition of functional materials and adhesive strength.

EMBODIMENTS FOR CARRYING OUT THE INVENTION

The double-sided adhesive film of the present invention is a baseless double-sided adhesive film including: a center layer formed of an adhesive; and adhesive layers laminated on front and rear faces of the center layer. (Hereinafter, for convenience, the adhesive layer formed on the front face of the center layer is referred to as the first adhesive layer, and the adhesive layer formed on the rear face of the center layer is referred to as the second adhesive layer.)

Center Layer

The center layer is made from a resin, which is typically employed as an adhesive, and formed into a film with a desired thickness. Examples of the resin include natural rubbers, synthetic rubbers, acrylic resins, olefin resins, silicone resins, urethane resins, and polyester resins, but are not limited to them. Note that examples of the synthetic rubber include styrene-butadiene-based, polyisobutylene-based, and isoprene-based synthetic rubbers, but are not limited to them. Examples of the acrylic resin include polymers of 2-ethylhexyl acrylate, butyl acrylate, and ethyl acrylate, but are not limited to them. Examples of the olefin resin include polystyrene-ethylene/butylene copolymers, ethylene-vinyl acetate copolymers, polyethylene (for example, polar group-containing polyethylene), and polystyrene-ethylene-propylene copolymers, but are not limited to them. Examples of the silicone resin include vinylpolydimethylsiloxane copolymers and vinyltrichlorosilane-alkoxysilane copolymers, but are not limited to them. Examples of the urethane resin include substances obtained by reacting polyisocyanate with the following polyols (polyester polyol, polylactone polyol, and the like), but are not limited to them. Examples of the polyester resin include saturated polyester resins and unsaturated polyester resins, but are not limited to them.

The center layer may be formed of a compound of some of the above-listed resins. The center layer may be a material with which one or some of resins other than the above-listed resins are additionally mixed, as long as the material containing some of the above-listed resins exhibits adhesive strength. For example, the center layer may be formed of a mixture of an acrylic resin and a vinyl acetate resin.

Note that the center layer is preferably formed of an acrylic resin. The acrylic resin may be obtained, for example, by polymerizing one or more of the following types of monomers by solution polymerization, bulk polymerization, emulsion polymerization, suspension polymerization, or the like. Examples of the monomers include acrylic acid, methacrylic acid, alkyl acrylates or methacrylic acid alkyl esters having 1 to 20 carbon atoms in which the alkyl group is unsubstituted or substituted (for example, methyl acrylate, acrylic acid ethyl, butyl acrylate, 2-ethylhexyl acrylate, isononyl acrylate, methyl methacrylate, hydroxyethyl methacrylate, hydroxypropyl methacrylate, and dimethylaminoethyl methacrylate), acrylonitrile, acrylamide, methylolacrylamide, and glycidyl methacrylate, but are not limited to them. The acrylic resin may be a copolymer of the acrylic acid monomer described above and, for example, vinyl acetate, vinylidene chloride, styrene, itaconic acid, maleic anhydride, or the like.

The center layer may be formed of a water-based acrylic emulsion resin.

Note that the center layer is preferably employed by being formed into a non-oriented film from the above-described resin without undergoing orientation treatment such as stretching during the manufacturing process. This makes the physical properties of the film uniform or similar in all directions without greatly depending on the directions.

Although the thickness of the center layer depends on the application and the resin material (adhesive material) employed, the thickness of the center layer is preferably from 1 μm to 150 μm, and is more preferably from 10 μm to 50 μm.

A raw material employed to form the center layer is, for example, a material obtained by polymerizing a compound of one or more types of raw material monomers or polymers and optionally an additive such as crosslinking agents, for example, by solution polymerization, bulk polymerization, emulsion polymerization, suspension polymerization, or the like.

Examples of the crosslinking agent that can be employed include epoxy resin, isocyanate, melamine resin, urea resin, etherified amino resin, and metal chelate. Note that the crosslinking of the resin that forms the center layer may be performed by adding the above-mentioned crosslinking agent during the polymerization.

Examples of the additives other than the crosslinking agent include antioxidants, thermally conductive materials, flame retardants, thermal shrinkage inhibitors, and electrically conductive materials.

The center layer can be formed (film-forming) using the above-described raw materials by an extrusion method such as a T-die method or an inflation method, a roll coater, a casting method, or the like. Three layers including a front face and a rear face, which will be described below as serving as the adhesive layers, may be formed at the same time.

The center layer may contain fiber fragments as pseudo-crosslinks. More specifically, pseudo-crosslinks caused by the entanglement of fiber fragments is formed in the layer, making it possible to reduce the flowability of the layer and physically harden the layer.

Examples of the fiber fragments to be employed include acrylic, polyester, nylon, olefin, rayon, glass, and the like. The denier number is 5 denier or less, and preferably 2 denier or less, and the length is preferably 5 mm or less.

The amount of the fiber fragments to be added is from 3 wt % to 40 wt %, and preferably from 5 wt % to 15 wt % with respect to 100 wt % of adhesive solids.

Adhesive Layer

Various known resins to be employed as adhesives can be usually used to form the adhesive layers laminated on the front and rear faces of the center layer described above.

Examples of the resin include natural rubbers, synthetic rubbers, acrylic resins, olefin resins, silicone resins, and urethane resins, but are not limited to them. Note that examples of the synthetic rubber include styrene-butadiene-based, polyisobutylene-based, and isoprene-based synthetic rubbers, but are not limited to them. Examples of the acrylic resin include methyl (meth) acrylate, ethyl (methyl) acrylate, butyl (meth)acrylate, and 2-ethylhexyl (meth)acrylate, but are not limited to them. Examples of the olefin resin include polyethylene (for example, containing polar group) and polypropylene, but are not limited to them. Examples of the silicone resin include siloxane-trichlorosilane and alcosilane, but are not limited to them. Examples of the urethane resin include polyester polyol, polycarbonate, polyale polyol, and polyalkylene polyol, but are not limited to them.

Note that the adhesive layer may be formed of a compound of some of the above-listed types of resin. Further, the adhesive layer may be a material with which one or some types of resin other than the above-listed types are additionally mixed, as long as the material containing some of the above-listed types of resin exhibits adhesive strength.

The adhesive layer is preferably formed of an acrylic resin. The acrylic resin may be obtained, for example, by polymerizing one or more of the types of monomers listed above for the center layer by solution polymerization, bulk polymerization, emulsion polymerization, suspension polymerization, or the like.

Note that the first adhesive layer and the second adhesive layer may be formed of different resins. However, the first adhesive layer and the second adhesive layer are preferably made from a resin that is the same as or belongs to the same family as the resin that forms the center layer. The same family means that the resins have a similar chemical structure, for example, while the resins are different in the side chain functional group in a unit structure or in part of the main backbone in the unit structure, their main backbones in the unit structure partially match each other.

The adhesive layer is preferably employed by forming the resin described above into a non-oriented film.

The thickness of the adhesive layer is preferably from 1 μm to 100 μm, and more preferably from 10 μm to 50 μm, with respect to one side of the center layer.

The adhesive layer may optionally contain additives such as tackifying agents, softeners, fillers, antioxidants, crosslinking agents, thermally conductive materials, or electrically conductive materials.

Examples of the tackifying agent may include the followings: Rosins (for example, rosin, gum rosin, modified rosin, rosin ester), terpene phenol resin, terpene resin, synthetic petroleum resins (for example, isoprene, cyclopentadiene, 1,3-pentadiene, and 1-pentene copolymers, copolymers of 2-pentene and dicyclopentadiene, 1,3-pentadiene-based resins, copolymers of indene, styrene, methylindene, and α-methylstyrene), phenol resins, xylene resins, alicyclic petroleum resins, coumarone-indene resins, styrenic resins, and dicyclopentadiene resins.

The crosslinking agent can be selected from the crosslinking agents listed above to be added to the center layer for use.

Fiber fragments may be dispersed in the adhesive layer. The types, denier numbers, and lengths of the fiber fragments are as described above for the center layer.

However, in order to ensure the adhesive strength of the adhesive layer, in cases where fiber fragments are dispersed in the adhesive layer, the density of the fiber fragments per unit volume is relatively lower than that of the center layer, and the flowability is relatively higher than that of the center layer.

Combination of Center Layer and Adhesive Layer

Through extensive research, the inventor(s) have found that slits and glue burrs at cutting are caused by the adhesive phenomenon of uncrosslinked components with low molecular weight that are inherent to the adhesive and the failure of stretching of the adhesive component, and have focused on the fact that not only the elongation ratios in the longitudinal and transverse directions but also the elongation ratio in the thickness direction is an important factor in order to solve the cause. The inventor(s) have also found that, if one or all of the similarity or gradient of elongation ratios, the similarity or gradient of molecular weights, and the similarity or gradient of crosslinks are exhibited at the interface between one face of one of the adhesive layers and the front face of the center layer and the interface between one face of the other adhesive layer and the rear face of the center layer, the elongation of each adhesive layer is set to be close to that of the center layer at the interface between the center layer and the adhesive layer, so that the elongation ratios of the entire film in the XYZ [longitudinal, transverse, thickness] directions can be equilibrated, and as a result, a desirable performance can be obtained without sacrificing the adhesive strength.

From the above discussion, in the double-sided adhesive film of the present invention, in order to obtain the gradient at the interface between the layers from stress relaxation, it is preferable that the resin that forms the center layer is the same resin or a resin that belongs to the same family as the resin that forms the first adhesive layer and the resin that forms the second adhesive layer, preferably a resin obtained by polymerizing a monomer having the same composition; the resin that forms the center layer is also a resin having a higher molecular weight (weight average molecular weight) than the resin that forms the first adhesive layer and the resin that forms the second adhesive layer. The weight average molecular weight of the resin that forms the center layer is, for example, from 2,000 to 1,500,000, is preferably from 5,000 to 500,000, and is particularly preferably from 200,000 to 300,000.

Alternatively, in the double-sided adhesive film of the present invention, in order to obtain the gradient at the interface between the layers from stress relaxation, it is preferable that the resin that forms the center layer is the same resin or a resin that belongs to the same family as the resin that forms the first adhesive layer and the resin that forms the second adhesive layer, preferably a resin obtained by polymerizing a monomer having the same composition; the resin for the center layer is also a resin having a higher extent of crosslinking than the resins that form the adhesive layers.

According to the double-sided adhesive film of the present invention having the configuration as described above, the center layer and the adhesive layer are each made from an adhesive resin, and the resins are similar to each other in terms of composition, so that the layers are easily matched with each other at an interface between the layers. The resin of the adhesive layer can almost completely penetrate deep into recesses of a fine uneven outer face of the center layer (there is no gap between the adhesive layer and the center layer). Accordingly, in addition to a high intermolecular force being obtained, a gradient of molecular weight or extent of crosslinking is produced from the center of the film in the thickness direction toward the outside (front and rear face sides), and the interface between the center layer and the adhesive layer disappears or is alleviated. This results in a gradient of the elongation rate in the thickness direction and a high bonding force between the layers, making it difficult for delamination to occur, making the entire film excellent in stress relaxation, further making it difficult to cause glue burrs to occur even at continuous punching.

Note that, in general, if the molecular weight or the extent of crosslinking of the resin is high, the flowability related to adhesive strength is reduced, but the shape retention ability is improved, and if the molecular weight or the extent of crosslinking of the resin is high, the elongation ratio is reduced.

In order to further strengthen the prevention of delamination between the center layer and the adhesive layer, what is effective is that differences in composition and the like between the resin that forms the center layer and the resin that forms the adhesive layer are reduced, for example, functionalities such as intermolecular crosslinking are exhibited in an interface region between the center layer and the adhesive layer, to bring interface phases of the layers as close to each other as possible.

According to the double-sided adhesive film of the present invention, the adhesive layers (the first adhesive layer and the second adhesive layer) are each formed of a resin having a relatively low molecular weight or low extent of crosslinking to exhibit adhesiveness of the adhesive layer, while the center layer is formed of a resin having a relatively high extent of crosslinking or high molecular weight to impart the shape retention ability, strength, and the like to the adhesive film, and all or part of the composition of the resins are common among the layers. This allows covalent bonding (crosslinking) reactions to occur between the functional groups of the components of the resins that form the adhesive layers and the resin that forms the center layer, and makes it possible to use a crosslinking agent such as epoxy or isocyanate for the center layer. Accordingly, for example, a part of the crosslinking agent in the center layer bleeds out into the adhesive layer, and the uncrosslinked component of the crosslinking agent undergoes the crosslinking reaction in the interface region between the center layer and each adhesive layer, resulting in a phenomenon of equilibration. This results in some molecules of the adhesive layers being absorbed (crosslinked or bonded) to molecules of the center layer. As a result, a gradient of molecular weight or extent of crosslinking is produced more effectively in the interface region. In addition, in cases where the composition of the resin that forms the center layer and the resin that forms each adhesive layers are different, a gradient of molecular composition is produced in the interface region (The difference in composition between the resin that forms the center layer and the resin that form each adhesive layer is alleviated). It is believed that these factors effectively eliminate or alleviate the interface between the center layer and the adhesive layer.

The produced gradient of: distribution of molecular weight, the extent of crosslinking, or the molecular composition in the interface region between the center layer and each adhesive layer eliminates or alleviates the interface between the center layer and the adhesive layer. Namely, the equilibration (balancing) between the center layer and each adhesive layer at the interface region produces a gradient of the elongation ratio in the thickness direction, and achieves a variety of properties: the absorption and dispersion of stress in the XYZ [longitudinal, transverse, thickness] directions, and the followability to the adherend. As a result, the adhesion performance is enhanced, and not only delamination and the like are difficult to occur but also heat shrinkage, warping, and the like are difficult to occur in the adhesive film when heated. In addition, the parting property during knife punching is excellent, glue burrs are difficult to occur at continuous punching, and slitting is also excellent.

The total thickness (center layer+first adhesive layer+second adhesive layer) of the double-sided adhesive film of the present invention is preferably from 5 μm to 300 μm, and particularly preferably from 40 μm to 160 μm.

As for the elongation ratio, the elongation ratios of the resin that forms the center layer in the longitudinal and transverse directions are preferably from 10% to 300%, more preferably from 20% to 200%, and particularly preferably from 80% to 150%. Note that the "elongation ratio" used herein is "elongation" referred to in JIS Z 0237 1991.

As for the elongation ratio of the adhesive layer, the elongation ratio of the resin that forms the center layer and the elongation ratio of the resin that forms each adhesive layer are preferably similar values. For example, a ratio between the elongation ratio of the resin that forms the center layer and the elongation ratio of the resins that form the first and second adhesive layers is preferably from 1:1 to 1:20, more preferably from 1:1 to 1:10, and particularly preferably from 1:1.5 to 1:2.5 (from 2:3 to 2:5) in both the longitudinal and transverse directions.

Figure 1:
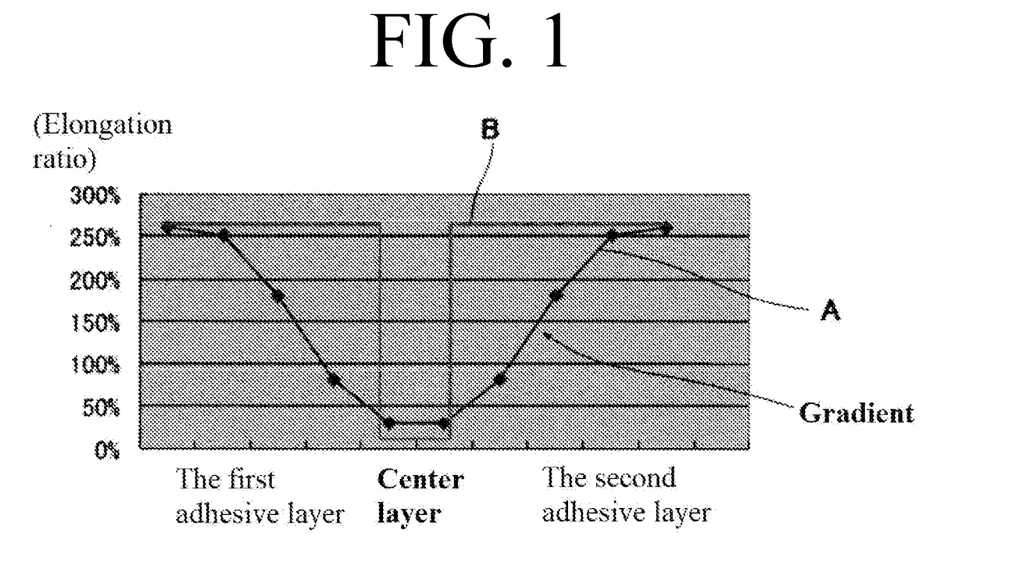
FIG. 1 shows elongation ratios in the thickness direction of a double-sided adhesive film of the present invention.

Note that, as described above, in the double-sided adhesive film of the present invention, the produced gradient of molecular weight, the extent of crosslinking, or the molecular composition in the interface region between the center layer and each adhesive layer eliminates or alleviates the interface between the center layer and the adhesive layer. Namely, the equilibration (balancing) between the center layer and each adhesive layer at the interface region produces a gradient of the elongation ratio in the thickness direction. FIG. 1 is a graph showing that the double-sided adhesive film of the present invention (A in the figure) has a gradient of the elongation ratio in the thickness direction (the elongation ratio gradually changing in the interface region), while a conventional double-sided adhesive film with a PET base (B in the figure) has no gradient of the elongation ratio (the elongation ratio changing abruptly at the interface).

As described above, since the double-sided adhesive film of the present invention has a gradient of the elongation ratio in the interface region, a ratio, even of 1:20, between the elongation ratio of the resin that forms the center layer and the elongation ratio of the resins that form the first and second adhesive layers in both the longitudinal and transverse directions can also be used satisfactorily.

In a case of three laminated layers or more laminated layers on the three laminated layers in the finished state of the double-sided adhesive film of the present invention, the elongation ratio of the entire layer is 300% or less, preferably from 20% to 300% in both the longitudinal and transverse directions, and preferably 250% or less from the viewpoint of properties of punching. A tolerance between the elongation ratio in the longitudinal direction and the elongation ratio in the transverse direction is set to ±20% or less with respect to one elongation ratio, and the elongation ratios in the longitudinal direction and the transverse direction are particularly preferably equal.

The double-sided adhesive film of the present invention has a structure in which a gradient of molecular weight, the extent of crosslinking, or the molecular composition is produced in the interface region between the center layer and each adhesive layer, and also a tolerance between the elongation ratio in the longitudinal direction and the elongation ratio in the transverse direction is set to ±20% or less with respect to one elongation ratio. Through extensive research, the inventor(s) have found that such structure and setting make it possible to uniformly stretch and affix the film according to the shape of the adherend, and further makes it easy for the film to plastically deform (follow) regardless of the shape, movement, and deformation of the adherend; moreover, no lack of uniformity in the plastic deformation produces an excellent stress relaxation effect, so that it is possible to prevent strain, breakage, and the like of the film after affixation.

The inventor(s) have also found that, also in consideration of the thickness direction, each of the elongation ratios in the longitudinal direction, the transverse direction, and the thickness direction preferably has a tolerance of ±20% or less with respect to both the elongation ratios in the other two directions.

In order to obtain the above-described gradient at the interface between layers from stress relaxation, the center layer is preferably formed of a resin having Tg (glass transition point) similar to Tg of the resins that form the first and second adhesive layers. For example, the difference between Tg of the resin that forms the first adhesive layer and/or the second adhesive layer and Tg of the resin that forms the center layer is from 1 to 80, preferably from 1 to 50, and particularly from 1 to 20.

In cases where the double-sided adhesive film of the present invention is required to have electrical conductivity, an electrically conductive material such as conductive carbon, zinc oxide, or tin oxide can be dispersed in the adhesive layer and the center layer. The particle diameter of the electrically conductive material is preferably from 0.01 μm to 30 μm, and more preferably from 0.01 μm to 0.02 μm. Polypyrrole or polyaniline, which is an organic electrically conductive agent, may also be additionally used.

The amount of the electrically conductive material is preferably from 20 wt % to 40 wt % (from 20 to 40 parts by weight) with respect to the amount (100 wt %) of the resin that forms each of the center layer and the adhesive layers. Furthermore, both the electrical conductivity and the adhesive strength are preferably controlled with gradient percentages such that, for example, an electrically conductive material of 40 wt % is used for the center layer with respect to 100 wt % of the resin that forms the center layer, and an electrically conductive material of 20 wt % is used for each of the adhesive layer on the front and rear faces (the first adhesive layer and the second adhesive layer) with respect to 100 wt % of the resins that form the adhesive layers (there being a gradient in wt % of the electrically conductive material in the thickness direction from the center layer to each of the first adhesive layer and the second adhesive layer).

In cases where the double-sided adhesive film of the present invention is required to have heat dissipation, a thermally conductive material such as carbon fiber fragments, aluminum nitride, zinc oxide, nickel, or tin oxide can be dispersed in the adhesive layer and the center layer. The particle diameter of the thermally conductive material is preferably from 0.01 μm to 30 μm, and more preferably from 0.1 μm to 2 μm. The amount of the thermally conductive material is preferably from 20 wt % to 60 wt % (from 20 to 60 parts by weight) with respect to the amount (100 wt %) of the resin that forms each of the center layer and the adhesive layers. Furthermore, both the thermal conductivity and the adhesive strength are preferably controlled with gradient percentages such that, for example, a thermally conductive material of 50 wt % is used for the center layer with respect to 100 wt % of the resin that forms the center layer, and a thermally conductive material of 20 wt % is used for each of the adhesive layer on the front and rear faces with respect to 100 wt % of the resins that form the adhesive layers (there being a gradient in wt % of the thermally conductive material in the thickness direction from the center layer to each of the first adhesive layer and the second adhesive layer).

Note that, for the double-sided adhesive film of the present invention, in order to satisfy requirements to follow the stretchability and flexibility of the adherend in the longitudinal and transverse directions, a measurement method and measured values for the requirements are in accordance with JIS-Z-1528 (2009). Although the peel angle in the longitudinal and transverse directions may be 180 degrees, it is preferably 90 degrees in order to measure the stress between layers of the adhesive. This is because important factors for affixation to the adherend as in the present invention include not only the peel value at the adherend interface but also the stress between layers of the adhesive from the viewpoint of the stretch followability to the adherend, including the protection of various sensor functions. Note that, in the 90-degree peel test, the peel speed is preferably from 20 mm/min to 200 mm/min.

A 90-degree peel test was conducted on a conventional double-sided tape with a non-woven fabric base and the double-sided adhesive film (tape-like) of the present invention. The results will be described below.

Note that the double-sided adhesive film used in that test had a structure in which a first adhesive layer made from an acrylic resin (weight average molecular weight: about 400,000) was laminated on the front face of a center layer made from an acrylic resin (weight average molecular weight: about 800,000) and a second adhesive layer made from an acrylic resin (weight average molecular weight: about 400,000) was laminated on the rear face of the center layer.

In the test method, first, evaluation samples are cut into pieces with a width of 25 mm. Next, each cut sample piece is affixed to a SUS and pressed back and forth with a 2 kg roll. After that, the test piece is left for 1 hour at room temperature (23° C.). Then, the adhesive strength was measured by peeling the piece in the direction of 90° at a peel speed of 50 mm/min.

Figure 2:
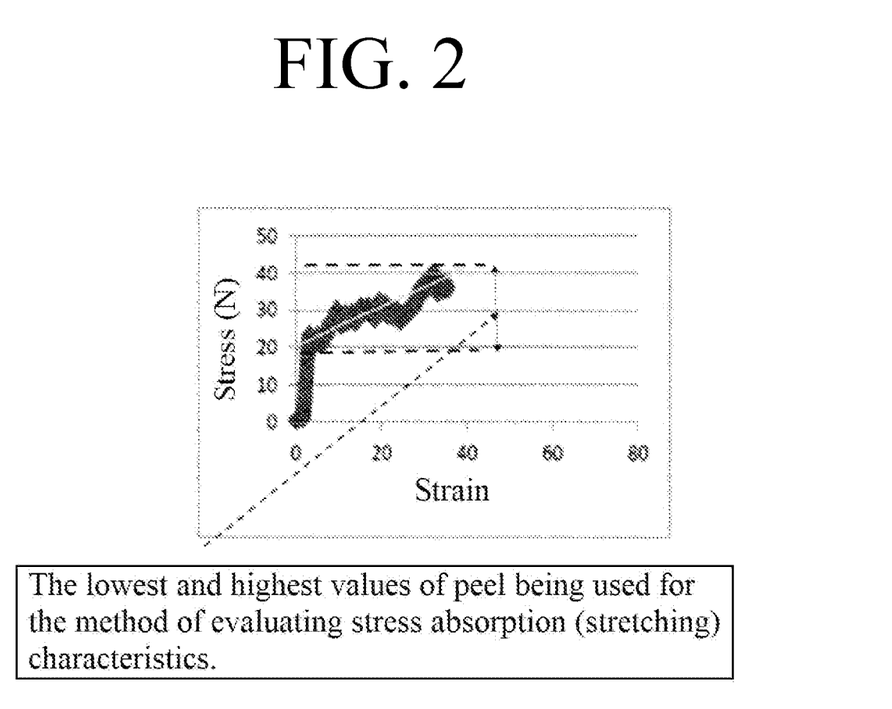
FIG. 2 shows results of a 90-degree peel test for the double-sided adhesive film of the present invention.
Figure 3:
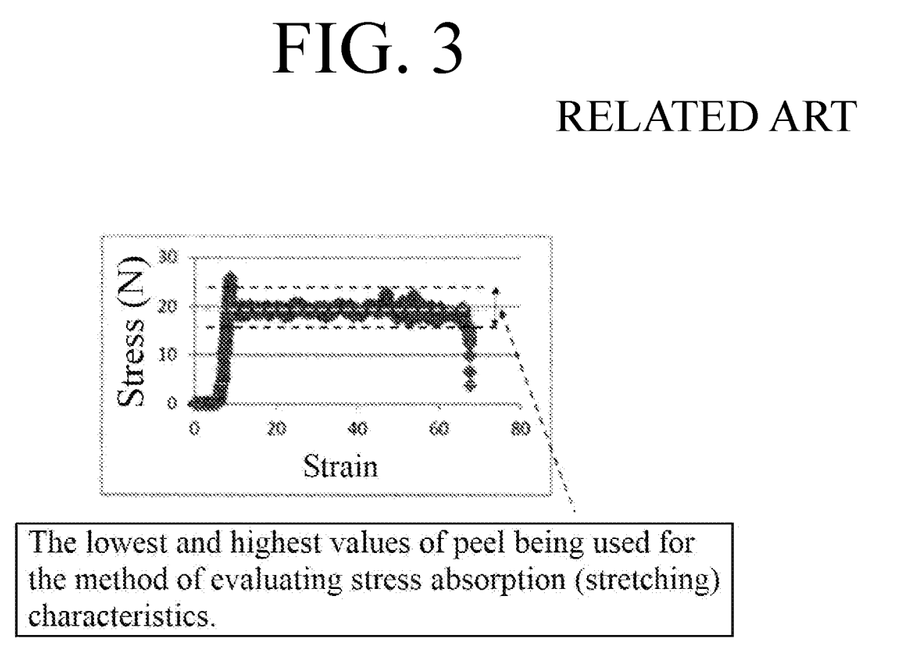
FIG. 3 shows results of a 90-degree peel test of a conventional double-sided tape with a non-woven fabric base.

FIG. 2 shows the results of a 90-degree peel test for the double-sided adhesive film of the present invention, and FIG. 3 shows the results of a 90-degree peel test for a conventional double-sided tape with a non-woven fabric base.

In 90-degree peel, which is a measurement method in which stress between layers is also to be evaluated, for the double-sided adhesive film of the present invention, a gradient between the peel measurement load cell starting value (about 20 N) and at the highest measurement value after the load cell measurement (about 40 N) was around 200% as observed (here, the lowest and highest values of peel being used for the method of evaluating stress absorption (stretching) characteristics), which indicate that peel values were obtained approximately 1.5 to 2 times those of the conventional double-sided tape with a non-woven fabric base, as shown in FIG. 2.

Method for Manufacturing Double-Sided Adhesive Film

The double-sided adhesive film of the present invention is manufactured, for example, by the following method.

The adhesive or its solution is coated onto a release paper with a kiss-roll coater, a gravure coater, a knife coater, a reverse-roll coater, or the like such that the thickness when dried is from 10 μm to 100 μm, and then the resulting sheet is dried at a temperature of from 60° C. to 120° C.

The center layer is laminated on this sheet, and the laminate sheet is dried at a temperature of from 60° C. to 120° C. and rolled up.

Further, while this roll is unrolled, the adhesive or its solution is coated onto the center layer with a kiss-roll coater, a gravure coater, a knife coater, a reverse-roll coater, or the like so that the thickness for dry process is from 10 μm to 100 μm, and then the resulting sheet is dried at a temperature of from 60° C. to 120° C. and rolled up again.

The double-sided adhesive film of the present invention can be formed into a rolled-up tape with one or both sides covered with a release material. In this case, following the rolling process described above, there is a process of slitting the tape to a desired width.

The double-sided adhesive film of the present invention can also be formed into a sheet with both sides covered with a release material. In this case, following the rolling process, cutting the sheet to any suitable shape or size is performed. The shaped sheet can be cut or punched into a desired shape for use.

Examples of the release material to be employed include a resin anchor-coated paper, a resin sheet made of polyethylene, polypropylene, or the like with high release properties, and optionally a sheet with a release agent such as a silicone-based material being coated onto its face.

The method for manufacturing the double-sided adhesive film of the present invention may be, instead of the above-described method, a method for simultaneously forming three layers: the center layer, the first adhesive layer, and the second adhesive layer.

For example, simultaneous formation of three layers by the three-layer T-die method is performed in such a manner that the raw materials of the center layer, the first adhesive layer, and the second adhesive layer are put into an extruder, heated and melted, then extruded from a T-die, and flow-casted and cooled on the double-sided silicone release paper face on a drawing roll face.

In the simultaneous formation of three layers by the three-layer T-die method, random or block copolymer adhesives are suitably employed such as thermoplastic SIS (styrene-isoprene-styrene), SBS (styrene-butadiene-styrene), and acrylics.

In a case of solvent-type simultaneous formation of three layers, although it is common with the above-mentioned simultaneous formation in that the three-layer T-die and double-sided release paper are used, after flow casting with the T-die, the materials are dried and cooled with a heat dryer.

In the solvent-type simultaneous formation of three layers, adhesives are suitably employed and selected such as acrylic resin, silicone resin, urethane resin, or thermoplastic SIS (styrene-isoprene-styrene) or SBS (styrene-butadiene-styrene) for the center layer, the first adhesive layer, and the second adhesive layer.

In a case of UV (ultraviolet) reaction solvent-free type simultaneous formation of three layers, although it is common with the above-mentioned simultaneous formation in that the three-layer T-die and double-sided release paper are used, after flow casting with the T-die, the materials are subjected to UV irradiation under nitrogen purge to block oxygen. Note that, in the method for blocking oxygen, for example, a stretched PET film with a thickness of from 5 μm to 200 μm that is transparent to UV and treated with single-sided release silicone is used, the release silicone face is bonded with the above-mentioned three-layer structure and then irradiated with UV.

In the UV (ultraviolet) reaction solvent-free type simultaneous formation of three layers, adhesives are suitably selected such as acrylic resin, silicone resin, urethane resin, or thermoplastic SIS (styrene-isoprene-styrene) or SBS (styrene-butadiene-styrene) for the center layer, the first adhesive layer, and the second adhesive layer, together with an ultraviolet initiator.

EXAMPLES

Example 1

Manufacturing of Center Layer

Acrylic emulsion resin (methacrylic acid ester; weight average molecular weight 600,000, DM772, manufactured by Hoechst Gosei Co., Ltd.), was subjected to flow casting using a casting device (25 μm OPP film by a comma coater), and dried at 100° C. to form a center layer (film) having a thickness of 10 μm.

Note that the elongation ratios of the resulting center layer in the longitudinal and transverse directions were both 180%, and Tg was 180° C.

Preparation of Adhesive Solution A

As an adhesive solution to form the first adhesive layer, adhesive solution A was prepared by, acrylic resin: acrylic acid alkyl ester-vinyl acetate copolymer adhesive (weight average molecular weight: about 400,000), for example, trademark SK-Dyne 1717, manufactured by Soken Chemical & Engineering Co., Ltd.

Preparation of Adhesive Solution B

As an adhesive solution to form the second adhesive layer, adhesive solution B was prepared by mixing 0.5 wt % of tolylene diisocyanate (45% solids) as a crosslinking agent with 100 wt % of adhesive solution A.

Manufacturing of Double-Sided Adhesive Film

Adhesive solution A prepared as described above was coated onto a release paper with a gravure coater in such an amount that the thickness when dried was 30 μm, and dried at 100° C. to form the first adhesive layer on the release paper to then be rolled up.

While this roll is unrolled, the center layer manufactured as described above was laminated onto the first adhesive layer, dried at 100° C., and then rolled up again.

While this roll is unrolled, adhesive solution B was coated onto the center layer formed as described above with a gravure coater in such an amount that the thickness when dried was 30 μm, and dried at 100° C. to form the second adhesive layer on the center layer to be then rolled up again.

Note that the elongation ratios of the first adhesive layer formed as described above in the longitudinal and transverse directions were both 270%, and the elongation ratios of the second adhesive layer in the longitudinal and transverse directions were both 240%.

Performance of Double-Sided Adhesive Film

The double-sided adhesive film of the present example finished through the above-described manufacturing process had an elongation ratio in the longitudinal direction of 36% and an elongation ratio in the transverse direction of 37%.

The elongation ratios of the double-sided adhesive film of the present example were suppressed to around 1/10 of those of the conventional baseless double-sided adhesive films. As a result, the adhesive film was prevented from flowing at punching and after affixation to the adherend, and dimensional stability was also observed.

An improved breaking strength of the double-sided adhesive film of the present example was observed (approximately three times that of the conventional baseless double-sided adhesive films), and the adhesive film was not fragile.

When the resulting double-sided adhesive film was slit to a width of 25 mm by a slitter, no adhesive exudation was observed at slitting.

The manufactured double-sided adhesive film described above was affixed to an LLDPE (low density polyethylene) film, the resulting film was cut into a piece of 100 mm×100 mm, and then the piece was affixed to a sphere (curved face) having a spherical diameter (diameter of the sphere) equivalent to 300 mm. This resulted in successful affixation without any strain in the longitudinal and transverse directions.

When the manufactured double-sided adhesive tape or sheet described above was stored in an environment of 80° C. and a humidity of 80% for 7 days, no defects such as adhesive exudation were observed.

What is claimed is:

1. A double-sided adhesive film without base, comprising:
   a center layer formed of an adhesive made from a resin; and
   adhesive layers laminated on a front face and a rear face of the center layer and formed of a resin that is same as or belongs to a same family as the resin that forms the center layer;
   a weight average molecular weight and an extent of crosslinking of the resin that forms the center layer being higher than a weight average molecular weight and an extent of crosslinking of the resins that form the adhesive layers,
   the film having a structure in which a gradient of the molecular weight and a gradient of the extent of crosslinking are produced in the interface region between the center layer and the adhesive layers, and
   a tolerance between an elongation ratio in a longitudinal direction and an elongation ratio in a transverse direction being ±20% or less with respect to one elongation ratio.

2. The double-sided adhesive film according to claim 1, wherein
   the elongation ratios in both the longitudinal and transverse directions are in a range of 20% to 300%.

3. The double-sided adhesive film according to claim 1, wherein
   the double-sided adhesive film has a total thickness of from 5 μm to 300 μm.

4. The double-sided adhesive film according to claim 1, wherein
   a ratio between the elongation ratio of the resin that forms the center layer and the elongation ratio of the resin that forms the adhesive layers is from 1:1 to 1:20.

5. The double-sided adhesive film according to claim 1, wherein
   the center layer and the adhesive layers are not oriented.

6. The double-sided adhesive film according to claim 1, wherein
   molecules in the resin that forms the center layer and molecules in the resin that forms the adhesive layers are crosslinked in an interface region between the center layer and the adhesive layer.

7. The double-sided adhesive film according to claim 1, wherein
   each of the elongation ratios in the longitudinal direction, the transverse direction, and a thickness direction has a tolerance of ±20% or less with respect to the elongation ratios in the other two directions.

8. The double-sided adhesive film according to claim 1, wherein
   the center layer is formed of a resin selected from natural or synthetic rubber, acrylic resin, olefin resin, silicone resin, urethane resin, and polyester resin.

9. The double-sided adhesive film according to claim 1, wherein
   the adhesive layer laminated on the front face of the center layer and the adhesive layer laminated on the rear face of the center layer are formed of resins having different adhesive strengths.

10. The double-sided adhesive film according to claim 1, wherein:
an electrically conductive material is added to the center layer and the adhesive layers, and
a weight percentage of the electrically conductive material added to the center layer with respect to the resin that forms the center layer is higher than a weight percentage of the electrically conductive material added to the adhesive layers with respect to the resin that forms the adhesive layers.

11. The double-sided adhesive film according to claim 1, wherein:
a thermally conductive material is added to the center layer and the adhesive layers, and
a weight percentage of the thermally conductive material added to the center layer with respect to the resin that forms the center layer is higher than a weight percentage of the thermally conductive material added to the adhesive layers with respect to the resin that forms the adhesive layers.

12. The double-sided adhesive film according to claim 1, wherein
fiber fragments are dispersed in the center layer.

13. The double-sided adhesive film according to claim 2, wherein
the double-sided adhesive film has a total thickness of from 5 μm to 300 μm.

14. The double-sided adhesive film according to claim 13, wherein
a ratio between the elongation ratio of the resin that forms the center layer and the elongation ratio of the resin that forms the adhesive layers is from 1:1 to 1:20.

15. The double-sided adhesive film according to claim 5, wherein
molecules in the resin that forms the center layer and molecules in the resin that forms the adhesive layers are crosslinked in an interface region between the center layer and the adhesive layer.

16. The double-sided adhesive film according to claim 4, wherein
each of the elongation ratios in the longitudinal direction, the transverse direction, and a thickness direction has a tolerance of ±20% or less with respect to the elongation ratios in the other two directions.

17. The double-sided adhesive film according to claim 14, wherein
each of the elongation ratios in the longitudinal direction, the transverse direction, and a thickness direction has a tolerance of ±20% or less with respect to the elongation ratios in the other two directions.

18. The double-sided adhesive film according to claim 6, wherein
the adhesive layer laminated on the front face of the center layer and the adhesive layer laminated on the rear face of the center layer are formed of resins having different adhesive strengths.

19. The double-sided adhesive film according to claim 8, wherein:
a thermally conductive material is added to the center layer and the adhesive layers, and
a weight percentage of the thermally conductive material added to the center layer with respect to the resin that forms the center layer is higher than a weight percentage of the thermally conductive material added to the adhesive layers with respect to the resin that forms the adhesive layers.

20. The double-sided adhesive film according to claim 8, wherein
fiber fragments are dispersed in the center layer.

* * * * *

UNITED STATES PATENT AND TRADEMARK OFFICE
CERTIFICATE OF CORRECTION

| | | |
|---|---|---|
| PATENT NO. | : 12,359,094 B2 | Page 1 of 1 |
| APPLICATION NO. | : 17/998400 | |
| DATED | : July 15, 2025 | |
| INVENTOR(S) | : Hisashi Hamano et al. | |

It is certified that error appears in the above-identified patent and that said Letters Patent is hereby corrected as shown below:

In the Specification

Column 3, Table 2, delete "1800 (4.5 pm)" and insert --1800 (4.5 μm)--.

Column 3, Table 2, delete "2300 (12 pm)" and insert --2300 (12 μm)--.

Column 3, Table 2, delete "4000 (25 pm)" and insert --4000 (25 μm)--.

Signed and Sealed this
Eighteenth Day of November, 2025

John A. Squires
*Director of the United States Patent and Trademark Office*